No. 839,423. PATENTED DEC. 25, 1906.
J. RICHARDS.
TRELLIS.
APPLICATION FILED JUNE 6, 1906.
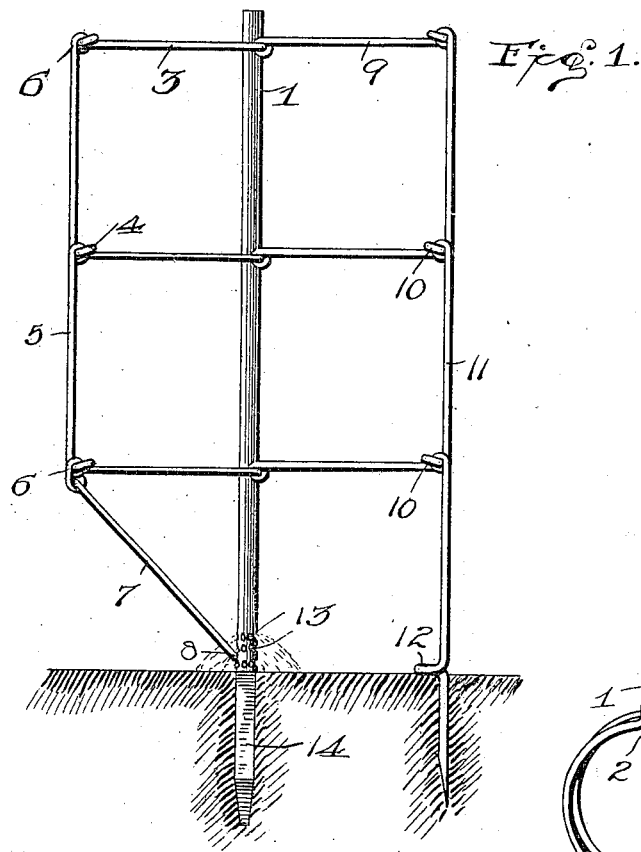
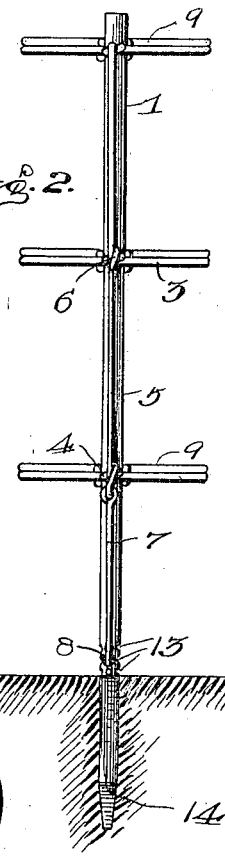
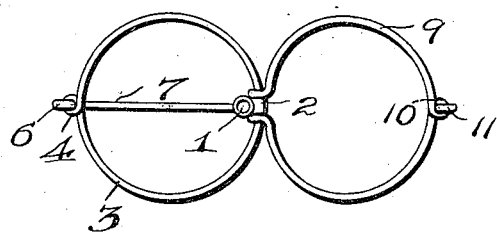
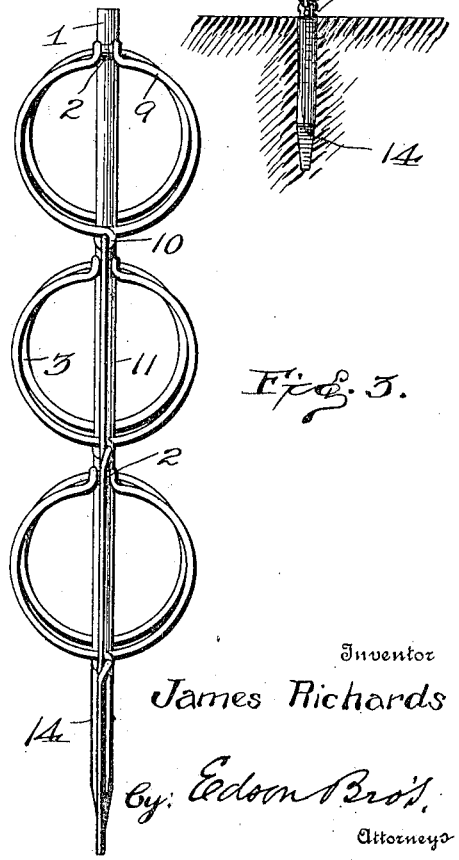
Inventor
James Richards
By Edoom Bro's
Attorneys
Witnesses

UNITED STATES PATENT OFFICE.

JAMES RICHARDS, OF BUCKHANNON, WEST VIRGINIA, ASSIGNOR OF ONE-HALF TO C. I. FARNSWORTH, OF BUCKHANNON, WEST VIRGINIA.

TRELLIS.

No. 839,423.

Specification of Letters Patent.

Patented Dec. 25, 1906.

Application filed June 6, 1906. Serial No. 320,455.

*To all whom it may concern:*

Be it known that I, JAMES RICHARDS, a citizen of the United States, residing at Buckhannon, in the county of Upshur and State of West Virginia, have invented certain new and useful Improvements in Trellises; and I do hereby declare the following to be a full, clear, and exact description of the invention, such as will enable others skilled in the art to which it appertains to make and use the same.

My invention relates to improvements in trellises or supports for plants.

It has for its object to provide a device of this character which is simple of construction, cheap of manufacture, may be folded for transportation, and is also adapted to hold and feed water and fertilizer to the plants.

The invention consists in the features of construction and combinations of parts hereinafter described, and more particularly pointed out in the claims concluding this specification.

In the accompanying drawings, illustrating the preferred embodiment of this invention, Figures 1 and 2 are elevations of the support or trellis erected. Fig. 3 is an elevation of the trellis folded, and Fig. 4 is a plan view of the trellis erected.

Referring more particularly to the drawings, 1 is the main upright or tube, to which are secured at intervals a series of eyepieces 2, through each of which there passes a ring or hoop 3, preferably made of wire and having an eye 4 formed at the side farthest from the eyepiece through which it passes. An upright supporting-rod 5, preferably of wire, connects with the eye on each of the rings or hoops, preferably by means of eyes 6, formed on said rod at intervals corresponding to the distance between the main upright. To the lower end of the rod 5, which terminates at the lowest ring or loop, is connected a prop 7, adapted to be inserted into an opening 8 in the main upright, whereby the rings or hoops are supported in horizontal positions.

A second series of rings or hoops 9 extend from the other side of the main upright. Each of these rings is also preferably made of wire, each end being secured to the corresponding ring of the other series at opposite sides of the eyepieces 2. Each of these rings is also provided with an eye 10 at the side farthest from its connection with the main upright. Said eyes are connected by a rod or support 11, formed similarly to the rod 5, except that it extends below the lowest ring or hoop for insertion into the ground and is provided with a horizontally-extending loop 12, adapted to contact with the surface of the ground to support the rings 9 horizontally.

The main upright may be made of a piece of pipe or tubular metal provided with a stopper in its lower end, or it may be made of a solid piece bored out down to the opening 8 for holding the prop 7. A series of small perforations 13, arranged near the opening 8, together with said opening, serve to feed water or fertilizer placed in the tubular feed water or fertilizer placed in the tubular portion of the upright to the roots of the plants in connection with which the trellis is used. The lower end of the upright 1 is flattened, as at 14, to prevent the same from turning after being inserted in the ground.

It will be noted that when folded the device is compact and may be easily transported from place to place.

My trellis is especially designed for the growing of tomato-plants, peas, cucumbers, and other vegetables and flowers.

I claim—

1. A trellis comprising a main upright, a series of rings or hoops pivoted to said main upright and adapted to be folded thereon, a rod or upright connecting said rings at their outer sides and a prop connected to the lower end of said rod and adapted to engage an opening in the main upright to support said rings horizontally.

2. A trellis comprising a tubular main upright having an opening near its lower end whereby liquid placed in said tubular upright may be fed therefrom, a series of rings or hoops pivoted on said upright and adapted to be folded thereon, and means connected to said rings at their outer sides to support said rings horizontally.

3. A trellis comprising a main upright having a series of eyepieces secured at intervals thereto, a series of rings or hoops, one passing through each of said eyepieces, whereby they are pivotally connected to said upright and may be folded thereon, a second series of rings or hoops, extending in the opposite direction from the first series and adapted to be independently folded on said upright, and means to support said rings horizontally.

4. A trellis comprising a main upright having a series of eyepieces secured at intervals thereto, a series of rings or hoops, one passing through each of said eyepieces, whereby they are pivotally connected to said upright and may be folded thereon, a second series of rings or hoops extending in the opposite direction from the first series and each connected to one of the rings of the first series at the ends of its eyepiece, said second series of rings also adapted to be folded upon the upright, and means to support both series of rings horizontally.

5. A trellis comprising a main upright having a series of eyepieces secured at intervals thereto, a series of rings or hoops, one passing through each of said eyepieces, whereby they are pivotally connected to said upright and may be folded thereon, a second series of rings or hoops extending in the opposite direction from the first series at the sides of its eyepiece, said second series of rings also adapted to be folded upon the upright, and rods or uprights, one connecting each series of rings at their outer sides, one of said rods extending downward for insertion into the ground and having a projecting loop adapted to engage the surface of the ground to support one series of rings horizontally, the other rod having a prop connected to its lower end, said prop adapted to engage an opening in the main upright and support the other series of rings horizontally.

6. A trellis comprising a tubular main upright having a series of small openings near its lower end whereby liquid placed in said tubular upright may be fed therefrom, a series of rings or hoops pivoted to said upright and adapted to be folded thereon, an upright rod connected to the outer sides of said rings, and a prop attached to the lower end of said rod and adapted to engage another opening in the main upright whereby said rings are supported horizontally.

7. A trellis comprising a tubular main upright having its lower end flattened and a series of small openings near its lower end whereby liquid placed in said tubular upright may be fed therefrom, a series of rings or hoops pivoted to said upright and adapted to be folded thereon, an upright rod connected to the outer sides of said rings, and adapted to engage another opening in the main upright whereby said rings are supported horizontally.

In testimony whereof I affix my signature in presence of two witnesses.

JAMES RICHARDS.

Witnesses:
 EUGENE BROWN,
 B. L. BROWN.